Dec. 18, 1923.

M. P. WETMORE

WELDED JOINT

Filed June 22, 1920

1,477,618

INVENTOR
Murer P. Wetmore
BY
ATTORNEY

Patented Dec. 18, 1923.

1,477,618

UNITED STATES PATENT OFFICE.

MINER P. WETMORE, OF NEWARK, NEW JERSEY, ASSIGNOR TO HYGRADE ENGINEERING CO., INC., A CORPORATION OF NEW JERSEY.

WELDED JOIN..

Application filed June 22, 1920. Serial No. 390,936.

*To all whom it may concern:*

Be it known that I, MINER P. WETMORE, a citizen of the United States of America, residing at Newark, county of Essex, State of New Jersey, have invented certain new and useful Improvements in Welded Joints, of which the following is a specification.

My invention relates to electric welding and comprises a special form of electrically welded joint between a wire and a tube which is particularly easy of formation requires a relatively small amount of electric current and mechanical force for the welding operation and is also particularly strong and of good electrical conductivity. The best form of structure embodying my invention at present known to me is illustrated in the accompanying sheet of drawings in which—

Throughout the drawings like reference characters indicate like parts.

The embodiment of the invention here illustrated may most conveniently be made by the welding apparatus shown and described in my copending application Serial No. 377487, filed April 29, 1920, allowed June 3, 1920. It comprises a tube 1 partway telescoped over a section of wire 2, the diameter of which wire is slightly less than the internal diameter of the tube, and then partly flattened down on the wire by the pressure of a pair of electrodes between which the joint is grasped, the tube and portion of the wire enclosed therein, which is also slightly flattened, as shown, having been both softened by the passage of a welding current of electricity passing through them from one electrode to the other and welded together along the meeting flattened surfaces to form the joint 3.

Figure 1:
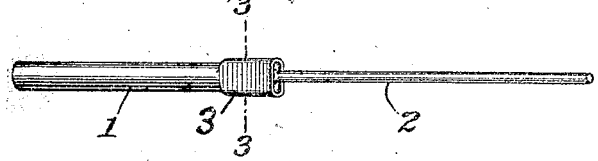
Fig. 1 is a perspective view of sections of wire and tube welded together to form my invention.
Figure 2:
Fig. 2 is a longitudinal section of the same on an enlarged scale, parts being broken away.
Figure 3:
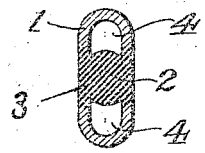
Fig. 3 is a cross section on an enlarged scale taken on line 3—3 of Fig. 1.

In thus making this joint, all of the current first passes through the thin walls of the tube, quickly softening it so that it collapses on the enclosed wire without requiring the exertion of much pressure by the electrodes. The contacts so first established between the opposite flattened portions of the tube wall and the cylindrical body of the enclosed wire exist only along narrow lines parallel to the axis of the wire. Consequently the areas of metal in contact are small and only a little current is needed to quickly soften the parts so in contact and to raise them to a welding heat. The wire enclosed by the tube and which has already been heated by radiation from the tube walls which have been heated by the initial passage of current through them is easily brought to a proper condition for weldi $_\varsigma$ by the additional heat generated by t $_{\dot{u}\dot{\epsilon}}$ portion of the current which passes through it as soon as the tube walls are collapsed upon it. As a result, the portions of the cylindical wire surface in contact with the collapsed tube walls are rapidly heated and softened and easily flattened by the pressure of the electrodes so that the wire and tube are welded together throughout substantial areas of their opposing surfaces, as shown in Fig. 3, forming a mechanically strong joint and one also having high electrical conductivity.

My invention is particularly useful for filament supports and connections in incandescent electric lamps. In such case the cylindrical portion of tube 1 serves as a cup for receiving the end of the filament and the partially collapsed portion of the tube, when fused into the glass of the lamp together with a portion of wire 3, forms a particularly firm anchorage therefor and one not liable to crack the glass by expansion, as the hollow spaces 4, 4, left between tube and wire permit the tube, which is usually made of nickel, to yield by bending or further collapsing before exerting force enough to crack the surrounding glass. The wire 1 is usually made of platinum or of some composite structure which has the same coefficient of expansion under heat as glass has.

The advantages of the invention therefore comprise not only the useful qualities of the completed article itself, but also the saving of time, mechanical power, and electrical current consumed in its manufacture.

Having described my invention I claim:

As an article of manufacture an electrical and mechanical connector comprising a section of wire over and onto which a section of tubing of somewhat larger diameter has been flattened, the meeting surfaces being welded together while the remaining portions of the wire and tube surfaces are left separate each from the other.

MINER P. WETMORE.

Witnesses:
 CLIFFORD TITCHEN.
 ROBT. VAN BRUNT.